United States Patent
Yajima et al.

(10) Patent No.: US 12,417,281 B2
(45) Date of Patent: Sep. 16, 2025

(54) INFORMATION PROCESSING APPARATUS AND INFORMATION PROCESSING METHOD

(71) Applicant: Sony Corporation, Tokyo (JP)

(72) Inventors: Takumi Yajima, Tokyo (JP); Shuichi Konami, Chiba (JP)

(73) Assignee: SONY CORPORATION, Tokyo (JP)

( * ) Notice: Subject to any disclaimer, the term of this patent is extended or adjusted under 35 U.S.C. 154(b) by 1194 days.

(21) Appl. No.: 16/979,874

(22) PCT Filed: Dec. 10, 2018

(86) PCT No.: PCT/JP2018/045324
§ 371 (c)(1),
(2) Date: Sep. 11, 2020

(87) PCT Pub. No.: WO2019/181099
PCT Pub. Date: Sep. 26, 2019

(65) Prior Publication Data
US 2021/0012003 A1    Jan. 14, 2021

(30) Foreign Application Priority Data

Mar. 20, 2018  (JP) .................................. 2018-052884

(51) Int. Cl.
*G06N 3/08* (2023.01)
*G06F 21/55* (2013.01)

(52) U.S. Cl.
CPC ............. *G06F 21/554* (2013.01); *G06N 3/08* (2013.01); *G06F 2221/034* (2013.01)

(58) Field of Classification Search
CPC ... G06N 3/02; G06N 3/08; G06N 5/02; G06F 21/554; G06F 21/6254; G06F 2221/03
See application file for complete search history.

(56) References Cited

U.S. PATENT DOCUMENTS

2002/0158599 A1   10/2002 Fujita
2012/0215528 A1    8/2012 Nagatomo
(Continued)

FOREIGN PATENT DOCUMENTS

CN        101799880 A      8/2010
WO      2016/157950 A1    10/2016
WO      2018/008605 A1     1/2018

OTHER PUBLICATIONS

"Heliza: talking dirty to the attackers" Wagener et al (Year: 2010).*
(Continued)

*Primary Examiner* — Luis A Sitiriche
(74) *Attorney, Agent, or Firm* — XSENSUS LLP

(57) ABSTRACT

[Problem] To efficiently collect data for analyzing attack methods while preventing illegal acquisition of learned knowledge.
[Solution] Provided is an information processing apparatus including: an output control unit that controls an output of an intelligent processing result based on input data input by a third party and learned knowledge learned by a neural network, in which, when it is determined that the input by the third party is not for a legitimate purpose, the output control unit processes the intelligent processing result so that quality of the intelligent processing result decreases, and allows output of the processed intelligent processing result.

20 Claims, 13 Drawing Sheets

(56) References Cited

U.S. PATENT DOCUMENTS

| | | | |
|---|---|---|---|
| 2015/0304348 A1 | 10/2015 | Oakenfull | |
| 2017/0206357 A1* | 7/2017 | Gorelik | G06F 21/54 |
| 2017/0272472 A1* | 9/2017 | Adhar | G06F 21/602 |
| 2018/0152469 A1* | 5/2018 | Smith | H04L 63/1433 |
| 2018/0336463 A1* | 11/2018 | Bloom | G06N 3/08 |
| 2019/0020669 A1* | 1/2019 | Glatfelter | G06N 20/00 |

OTHER PUBLICATIONS

"Adversarial Examples for Semantic Segmentation and Object Detection" Cihang Xie, Jianyu Wang, Zhishuai Zhang, Yuyin Zhou, Lingxi Xie, Alan Yuille; Proceedings of the IEEE International Conference on Computer Vision (ICCV), 2017, pp. 1369-1378 (Year: 2017).*

"Introduction to Cyberdeception" Rowe et al © Springer International Publishing Switzerland 2016 (Year: 2016).*

Erwan Le Merrer et al: "Adversarial Frontier Stitching for Remote Neural Network Watermarking", arxiv.org, Cornell University Library, 201 Olin Library Cornell University Ithaca, NY 14853, Nov. 6, 2017.

Erwin Quiring et al: "Fraternal Twins: Unifying Attacks on Machine Learning and Digital Watermarking", arxiv.org, Cornell University Library, 201 Olin Library Cornell University Ithaca, NY 14853, Mar. 16, 2017 (Mar. 16, 2017), XP080757402.

Juuti Mika et al: "PRADA: Protecting Against DNN Model Stealing Attacks", 2019 IEEE European Symposium on Security and Privacy (EUROS&P), Nov. 20, 2018 (Nov. 20, 2018), XP055789849, DOI: 10.1109/EuroSP.2019.00044 ISBN: 978-1-7281-1148-3 Retrieved from the Internet: URL:https://arxiv.org/pdf/1805.02628v4.pdf.

Yunhui Long et al: "Understanding Membership Inferences on Well-Generalized Learning Models", arxiv.org, Cornell University Library, 201 Olin Library Cornell University Ithaca, NY 14853, Feb. 14, 2018 (Feb. 14, 2018), XP080856614.

International Search Report and Written Opinion mailed on Mar. 12, 2019 for PCT/JP2018/045324 filed on Dec. 10, 2018, 7 pages including English Translation of the International Search Report.

* cited by examiner

FIG.12

| TYPE OF INPUT DATA | TYPE OF INTELLIGENT PROCESSING | DOMAIN | TYPE OF ATTACK | ATTACK DETECTOR | PROTECTION MEASURES |
|---|---|---|---|---|---|
| IMAGE | CLASS CLASSIFICATION | ANIMAL | Random-A | Random-A-detector | OUTPUT LABEL WITH THIRD HIGHEST RELIABILITY |
| IMAGE | CLASS CLASSIFICATION | VEHICLE | Random-B | Random-B-detector | RANDOMLY OUTPUT LABELS FROM LABELS WITH CLOSENESS OF X OR MORE |
| IMAGE | SEGMENTATION | FACE | GAN-A | GAN-A-detector | ADDITION OF NOISE/SMALL |
| IMAGE | SEGMENTATION | EYES | GAN-A | GAN-A-detector | ADDITION OF NOISE/LARGE EXPANSION OF REGION |
| ... | ... | ... | ... | ... | ... |

INFORMATION PROCESSING APPARATUS AND INFORMATION PROCESSING METHOD

CROSS-REFERENCE TO RELATED APPLICATIONS

The present application is based on PCT filing PCT/JP2018/045324, filed Dec. 10, 2018, which claims priority to JP 2018-052884, filed Mar. 20, 2018, the entire contents of each are incorporated herein by reference.

FIELD

The present disclosure relates to an information processing apparatus and an information processing method.

BACKGROUND

In recent years, various functions using neural networks have been developed. Further, techniques for improving performance and efficiency of the neural networks have been actively researched. For example, Non Patent Literature 1 discloses a technique called "distillation" in which a new model is caused to newly learn a relationship between an input and an output in a trained model.

If the above-mentioned distillation technique is used, then it becomes possible to transfer knowledge, which is learned by using a complicated network, to a simple network, and it is expected that the network will be downsized and that calculation cost will be reduced.

CITATION LIST

Non Patent Literature

Non Patent Literature 1: Geoffrey Hinton, two others, "Distilling the Knowledge in a Neural Network", Mar. 9, 2015, [Online], [Searched on Mar. 11, 2018], Internet <https://arxiv.org/pdf/1503.02531.pdf>

SUMMARY

Technical Problem

However, for example, when publishing the trained model to a third party on the Internet or the like, the third party acquires output data of the trained model for prepared input data, and is thereby capable of distilling the learned knowledge of the trained model into another new model. Therefore, it is desired to establish effective protection measures against illegal acquisition of the learned knowledge by the distillation or the like.

Accordingly, the present disclosure proposes new and improved information processing apparatus and information processing method capable of efficiently collecting data for analyzing attack methods while preventing the illegal acquisition of the learned knowledge.

Solution to Problem

According to the present disclosure, an information processing apparatus is provided that includes: an output control unit that controls an output of an intelligent processing result based on input data input by a third party and learned knowledge learned by a neural network, wherein, when it is determined that the input by the third party is not for a legitimate purpose, the output control unit processes the intelligent processing result so that quality of the intelligent processing result decreases, and allows output of the processed intelligent processing result.

Moreover, according to the present disclosure, an information processing method is provided that includes: causing a processor to control an output of an intelligent processing result based on input data input by a third party and learned knowledge learned by a neural network, wherein the control further includes, when it is determined that the input by the third party is not for a legitimate purpose, processing the intelligent processing result so that quality of the intelligent processing result decreases, and allowing output of the processed intelligent processing result.

Advantageous Effects of Invention

As described above, according to the present disclosure, it becomes possible to efficiently collect data for analyzing the attack methods while preventing the illegal acquisition of the learned knowledge.

The above-described effect is not necessarily limited, and any of the effects shown in the present description or other effects which can be grasped from the present description may be exerted together with the above-described effect or in place of the above-described effect.

BRIEF DESCRIPTION OF DRAWINGS

FIG. 12 is a diagram illustrating an example of a setting of protection measures, which is stored in a protection measure DB according to the same embodiment.

DESCRIPTION OF EMBODIMENTS

Figure 1:
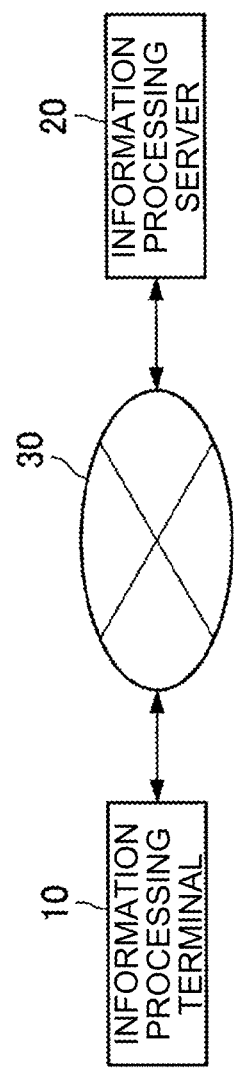
FIG. 1 is a block diagram illustrating a configuration example of an information processing system according to an embodiment of the present disclosure.

Hereinafter, preferred embodiments of the present disclosure will be described in detail with reference to the accompanying drawings. In this description and the drawings, components having substantially the same function and configuration are denoted by the same reference numerals, and a redundant description is omitted.

The description will be given in the following order.
1. Embodiment
1.1. Overview
1.2. System configuration example
1.3. Functional configuration example of information processing terminal 10
1.4. Information processing server 20
1.5. Details of processing
1.6. Flow of processing and setting of protection measures
2. Hardware configuration example
3. Summary 1. Embodiment <<1.1. Overview>>

First, an overview of an embodiment of the present disclosure will be described. As mentioned above, in recent years, techniques for improving performance and efficiency of neural networks have been actively researched. Examples of the technique as described above include the above-mentioned distillation.

According to the distillation, such effects are expected that, by transferring knowledge learned by a complicated model to a simple model, equivalent functions will be achieved in a smaller network and calculation cost will be reduced.

Meanwhile, since the distillation is achievable if there are input data and output data of a trained model for the input data, it is also expected that the distillation will be used for illegal acquisition of the learned knowledge. For example, in recent years, there are various services in each of which an application program interface (API) related to input and output of such a learned model is published on the Internet.

Therefore, for example, a third party (also referred to as an attacker) who aims at the illegal acquisition of the learned knowledge by the distillation or the like, acquires the output data of the trained model for the input data via the above-described API, and is thereby capable of easily copying the learned knowledge of the trained model to a new model.

In order to prevent such illegal acquisition of the learned knowledge as described above, countermeasures such as simply not returning an output when an attacker's attack (input that aims at illegal acquisition of the learned knowledge) is detected are also assumed. Meanwhile, when using such countermeasures, it is easily assumed that the attacker will take measures such as falsifying the input data in order to avoid a detection of the attack by an attack detection algorithm. For this, a protector takes countermeasures by updating the attack detection algorithm according to attack means, and as a result, a cat-and-mouse game between the attacker and the defender may continue semipermanently.

The technical idea according to the present disclosure is conceived with the above-described points in mind, and makes it possible to efficiently collect data for analyzing an attack method while preventing the illegal acquisition of the learned knowledge. For this purpose, an information processing method according to the embodiment of the present disclosure includes causing a processor to control output an intelligent processing result based on input data input by a third party and learned knowledge learned by a neural network. Moreover, the information processing method has a feature in that the control further includes, when it is determined that an input by the third party is not for a prescribed legitimate purpose, causing the processor to process the intelligent processing result so that quality thereof decreases, and allows output of a processed intelligent processing result.

Furthermore, in the information processing method according to the embodiment of the present disclosure, when it is determined that the input by the third party aims at the illegal acquisition of the learned knowledge, the processor may be caused to process the intelligent processing result so that the quality thereof decreases to an extent in which it is difficult for the third party to perceive the decrease of the quality, and to output such a processed intelligent processing result.

That is, the information processing method according to the embodiment of the present disclosure has a feature in that an attack is not simply rejected, but alternative data of which quality is decreased than an original output result is returned as an output, whereby complete distillation of the trained model is prevented. Further, the information processing method according to the embodiment of the present disclosure outputs alternative data with quality deterioration imperceptible by an attacker, thus making it possible for the processor to continuously input such input data for use in an illegal acquisition action for the learned knowledge without causing the attacker to scent the presence of the protection measures.

According to the above-described features of the information processing method according to the embodiment of the present disclosure, a large amount of input data used by the attacker are obtained, and the input data are analyzed, whereby it becomes possible to improve the attack detection algorithm always in advance of the attacker. Hereinafter, features of the information processing apparatus that achieves the information processing method according to the embodiment of the present disclosure will be described in detail.

<<1.2. System Configuration Example>>

First, a configuration example of the information processing system according to the embodiment of the present disclosure will be described. FIG. 1 is a block diagram illustrating a configuration example of the information processing system according to the present embodiment. Referring to FIG. 1, the information processing system according to the present embodiment includes an information processing terminal 10 and an information processing server 20. Further, the information processing terminal 10 and the information processing server 20 are connected to each other via a network 30 so as to be capable of communicating with each other.

(Information Processing Terminal 10)

The information processing terminal 10 according to the present embodiment is an information processing apparatus that provides a third party with an API related to a trained model based on a control of the information processing server 20. The above-described third party includes a user who uses the API based on a legitimate purpose and an attacker who uses the API for the purpose of illegally acquiring learned knowledge.

The information processing terminal 10 according to the present embodiment may be, for example, a personal computer (PC), a tablet, a smartphone or the like.

(Information Processing Server 20)

The information processing server 20 according to the present embodiment is an information processing apparatus that executes intelligent processing based on input data input via the above-described API and controls an output related to a result of the intelligent processing. Functions of the information processing server 20 according to the present embodiment will be described separately in detail.

(Network 30)

The network 30 has a function to connect the information processing terminal 10 and the information processing server 20. For example, the network 30 may include a public line network such as the Internet, a telephone line network, and a satellite communication network, various local area networks (LANs) including Ethernet (registered trademark), a wide area network (WAN), and the like. Moreover, the network 30 may include a dedicated line network such as an Internet protocol-virtual private network (IP-VPN). Furthermore, the network 30 may include a wireless communication network such as Wi-Fi (registered trademark) and Bluetooth (registered trademark).

The configuration example of the information processing system according to the present embodiment has been described above. The configuration described above with reference to FIG. 1 is merely an example, and the configuration of the information processing system according to the present embodiment is not limited to the example. The configuration of the information processing system according to the present embodiment is flexibly modifiable according to specifications and operations.

<1.3. Functional Configuration Example of Information Processing Terminal 10>>

Figure 2:
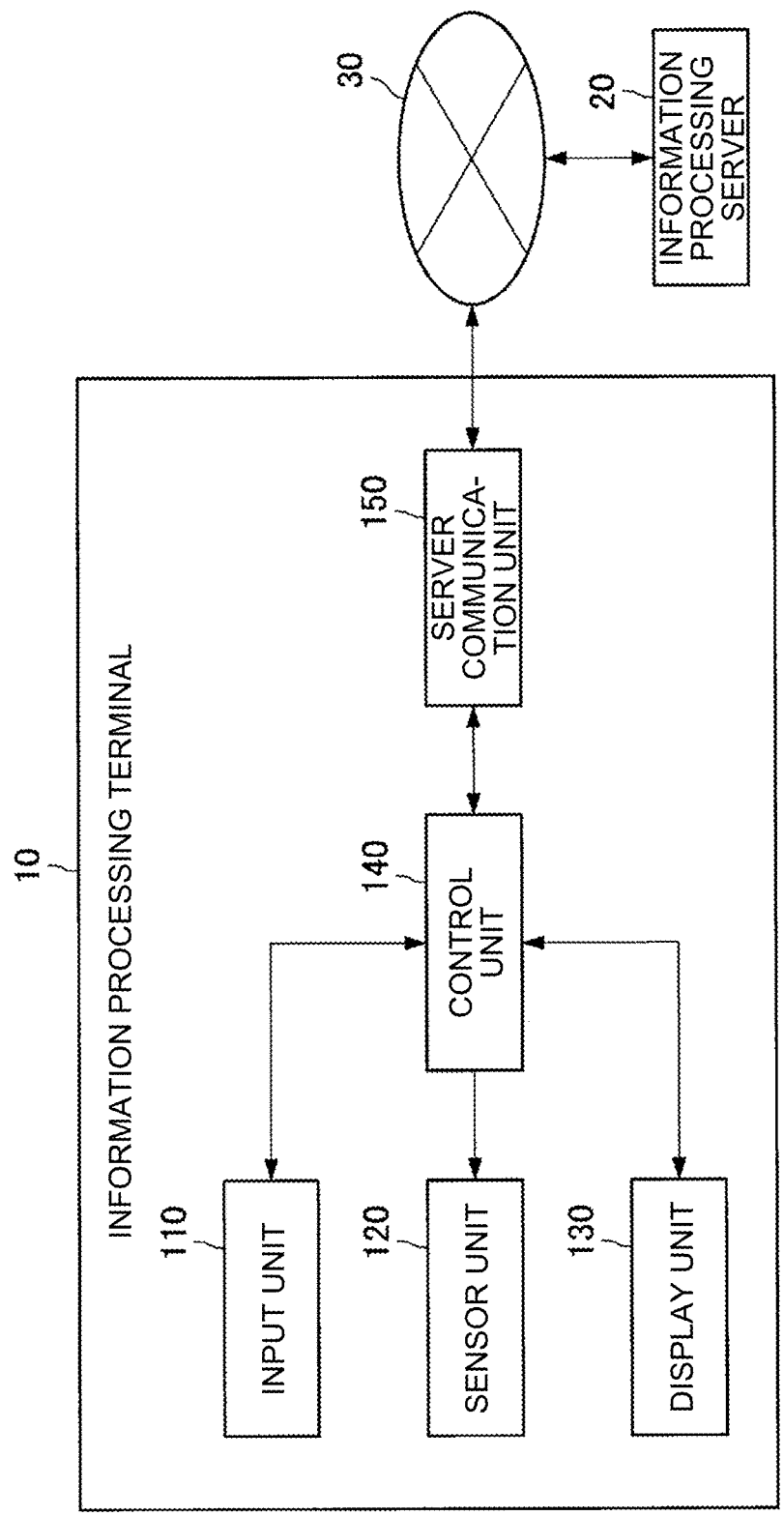
FIG. 2 is a block diagram illustrating a functional configuration example of an information processing terminal according to the same embodiment.

Next, a functional configuration example of the information processing terminal 10 according to an embodiment of the present disclosure will be described. FIG. 2 is a block diagram illustrating the functional configuration example of the information processing terminal 10 according to the present embodiment. Referring to FIG. 2, the information processing terminal 10 according to the present embodiment includes an input unit 110, a sensor unit 120, a display unit 130, a control unit 140, and a server communication unit 150.

(Input Unit 110)

The input unit 110 according to the present embodiment has a function to receive an input operation by a third party including a user or the like. For this purpose, the input unit 110 according to the present embodiment includes a keyboard, a touch panel, a mouse, various buttons, and the like.

(Sensor Unit 120)

The sensor unit 120 according to the present embodiment has a function to sense various pieces of information usable as input data for the trained model. For this purpose, the sensor unit 120 according to the present embodiment includes various sensors such as an imaging sensor, a microphone, an acceleration sensor, a gyro sensor, and a geomagnetic sensor.

(Display Unit 130)

The display unit 130 according to the present embodiment has a function to output visual information such as an image and text. The display unit 130 according to the present embodiment displays the API, which is related to the trained model, for example, based on the control of the information processing server 20.

For this purpose, the display unit 130 according to the present embodiment includes a display device that presents the visual information. Examples of the above-described display device include a liquid crystal display (LCD) device, an organic light emitting diode (OLED) device, and a touch panel. Moreover, the display unit 130 according to the present embodiment may output the visual information by a projection function.

(Control Unit 140)

The control unit 140 according to the present embodiment has a function to control each component provided in the information processing terminal 10. For example, the control unit 140 controls starting and stopping of each component. Moreover, the control unit 140 inputs, to the display unit 130, a control signal generated by the information processing server 20. Furthermore, the control unit 140 according to the present embodiment may have the same function as that of an output control unit 230 of the information processing server 20 to be described later.

(Server Communication Unit 150)

The server communication unit 150 according to the present embodiment has a function to perform telecommunications with the information processing server 20 via the network 30. Specifically, the server communication unit 150 transmits the input data for the trained model to the information processing server 20 based on an operation of the third party, which is detected by the input unit 110. Moreover, the server communication unit 150 also receives, from the information processing server 20, output data (intelligent processing result) for the above-described input data, a control signal related to an output of the intelligent processing result, and the like.

The functional configuration example of the information processing terminal 10 according to the present embodiment has been described above. The configuration described above with reference to FIG. 2 is merely an example, and the functional configuration of the information processing terminal 10 according to the present embodiment is not limited to the example. For example, the information processing terminal 10 according to the present embodiment does not necessarily have to include all of the components illustrated in FIG. 2. For example, the information processing terminal 10 can adopt a configuration that does not include the sensor unit 120 and the like. Moreover, as mentioned above, the control unit 140 according to the present embodiment may have the same function as that of the output control unit 230 of the information processing server 20. The functional configuration of the information processing terminal 10 according to the present embodiment is flexibly modifiable according to the specifications and the operations.

<<1.4. Information processing server 20>>

Figure 3:
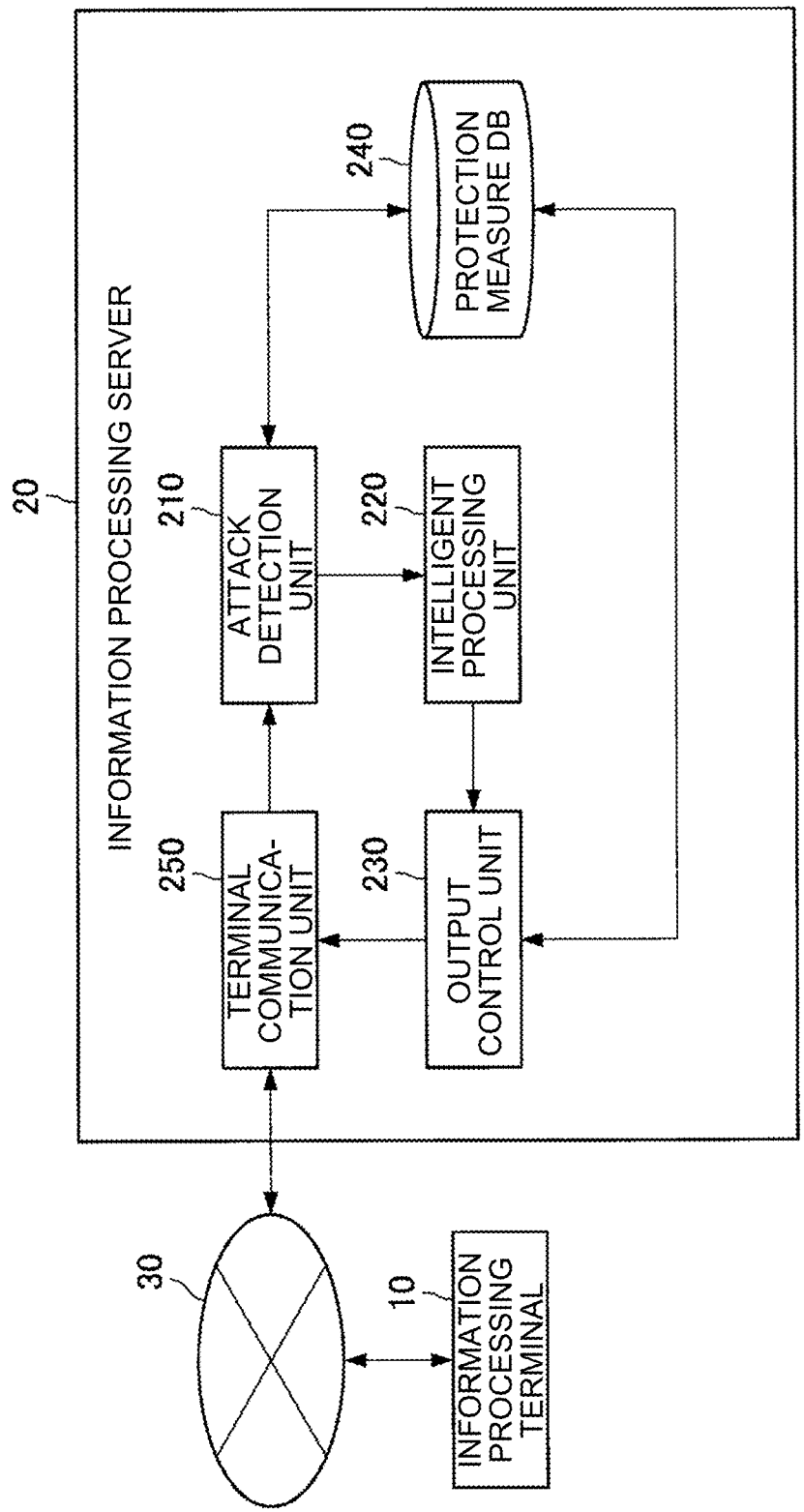
FIG. 3 is a block diagram illustrating a functional configuration example of an information processing server according to the same embodiment.

Next, a functional configuration example of the information processing server 20 according to an embodiment of the present disclosure will be described. FIG. 3 is a block diagram illustrating the functional configuration example of the information processing server 20 according to the present embodiment. Referring to FIG. 3, the information processing server 20 according to the present embodiment includes an attack detection unit 210, an intelligent processing unit 220, an output control unit 230, a protection measure DB 240, and a terminal communication unit 250.

(Attack Detection Unit 210)

The attack detection unit 210 according to the present embodiment has a function to detect an unauthorized use action by the attacker based on the input data transmitted from the information processing terminal 10. The above-described unauthorized use action includes an illegal acquisition action of the learned knowledge, which includes the distillation.

Since the attacker who aims at the distillation usually does not have a large amount of input data to be input to the trained model, it is assumed that the input data necessary for the distillation is prepared by some means.

As means for securing a large amount of input data, for example, a method using random data can be mentioned.

Therefore, when input data that ignores a domain assumed by the trained model and input data predicted to be generated by a random number generator is input, the attack detection unit 210 determines that the input data aims at the illegal acquisition of the learned knowledge. Note that the attack detection unit 210 can predict that the input data is random data, for example, when an average is not 0 or a variance is not 1 in an output result of BatchNormalization.

As means for securing a large amount of input data, for example, data generation by a generative adversarial network (GAN) or the like is also assumed. For example, in recent years, a generator that generates a face image by GAN has been developed. Therefore, when it is predicted that the input data is generated by GAN, the attack detection unit 210 may determine that the input data aims at the illegal acquisition of the learned knowledge.

Moreover, as means for securing a large amount of input data, for example, mentioned is a method using a data set that can be acquired from the Internet. Therefore, when it is predicted that the input data is such a data set as described above, the attack detection unit 210 may determine that the input data aims at the illegal acquisition of the learned knowledge.

(Intelligent Processing Unit 220)

The intelligent processing unit 220 according to the present embodiment executes various pieces of intelligent processing based on the input data transmitted from the information processing terminal 10 and the learned knowledge of the trained model. An example of the intelligent processing that can be executed by the intelligent processing unit 220 according to the present embodiment will be separately described later.

(Output Control Unit 230)

The output control unit 230 according to the present embodiment has a function to control an output of an intelligent processing result output by the intelligent processing unit 220. Here, the output control unit 230 according to the present embodiment has a feature in that, when the attack detection unit 210 determines that the input by the third party is for a legitimate purpose, that is, aims at the illegal acquisition of the learned knowledge by the distillation, the output control unit 230 processes the intelligent processing result so that quality thereof decreases, and allows the output the processed intelligent processing result to the information processing terminal 10.

At this time, when the illegal acquisition of the learned knowledge, which is performed by the distillation, is detected, the output control unit 230 according to the present embodiment may process the intelligent processing result to such an extent in which it is difficult for the third party to perceive the decrease of the quality, and may output such a processed intelligent processing result to the information processing terminal 10.

According to the above-described function of the output control unit 230 according to the present embodiment, the third party can be caused to continuously input the input data without causing the third party to be aware that the protection measures are taken. According to this, it becomes possible to analyze, from the acquired input data, features of the random number generator for use, a data generator by GAN or the like, or a data set available on the Internet, and to strengthen the attack detection algorithm by the attack detection unit 210 in advance.

Moreover, when the input data that aims at the distillation is detected, the output control unit 230 according to the present embodiment may process the intelligent processing result of the intelligent processing unit 220 so that quality of intelligent processing by a distillation destination model is lower than quality of intelligent processing by a distillation source model (the above-mentioned trained model), and may allow the output of the processed intelligent processing result to the information processing terminal 10.

According to the above-described function of the output control unit 230 according to the present embodiment, it becomes possible to prevent the learned knowledge of the trained model from being copied in a complete state, and to protect the value of the trained model.

(Protection Measure DB 240)

The protection measure DB 240 according to the present embodiment is a database that stores therein an attack detector and protection measures, which correspond to each of types of attack and each of generators for use in generating input data. The attack detection unit 210 according to the present embodiment is capable of detecting various attacks by using such attack detectors stored in the protection measure DB 240.

(Terminal Communication Unit 250)

The terminal communication unit 250 according to the present embodiment performs telecommunications with the information processing terminal 10 via the network 30. Specifically, the terminal communication unit 250 receives input data from the information processing terminal 10. Moreover, the terminal communication unit 250 transmits, to the information processing terminal 10, an intelligent processing result (that is unprocessed or processed) and a control signal related to the output of the intelligent processing result based on the control by the output control unit 230.

The functional configuration example of the information processing server 20 according to the embodiment of the present disclosure has been described above. The configuration described above with reference to FIG. 3 is merely an example, and the functional configuration of the information processing server 20 according to the present embodiment is not limited to the example. For example, the configuration described above may be implemented by being distributed by a plurality of devices. Further, as mentioned above, the function of the output control unit 230 may be achieved as a function of the control unit 140 of the information processing terminal 10. The functional configuration of the information processing server 20 according to the present embodiment is flexibly modifiable according to the specifications and the operations.

<<1.5. Details of Processing>>

Figure 4:
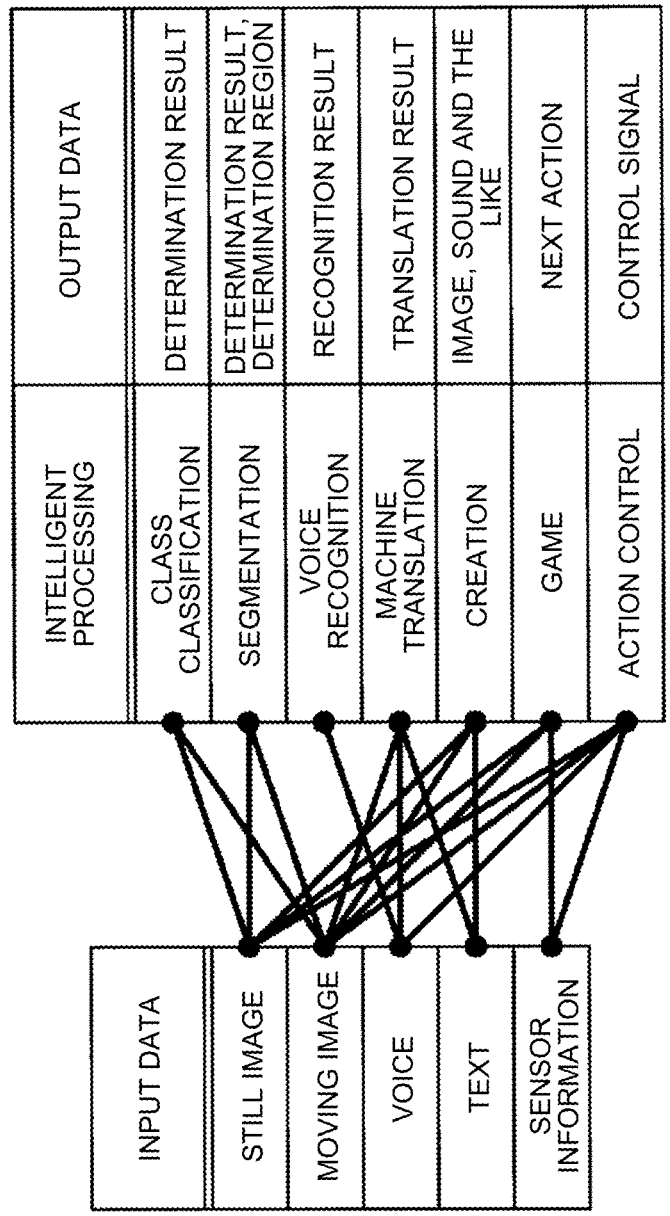
FIG. 4 is a diagram illustrating a relationship between input data and intelligent processing according to the same embodiment.

Next, processing of the intelligent processing result by the output control unit 230 according to the present embodiment will be described with a specific example. First, referring to FIG. 4, an example of the intelligent processing that can be executed by the intelligent processing unit 220 according to the present embodiment will be described. FIG. 4 is a diagram illustrating a relationship between the input data and the intelligent processing according to the present embodiment.

As illustrated in FIG. 4, the intelligent processing unit 220 according to the present embodiment can execute various pieces of intelligent processing based on various input data. The intelligent processing unit 220 according to the present embodiment may perform class classification based on, for example, a still image or a moving image, and output a determination result related to the class classification.

Moreover, the intelligent processing unit 220 according to the present embodiment may execute segmentation processing based on, for example, a still image or a moving image, and output a determination result or a determination region, which is related to the segmentation processing.

Furthermore, the intelligent processing unit 220 according to the present embodiment may perform natural language processing based on a voice or text, for example. The intelligent processing unit 220 can execute, for example, voice recognition based on a voice, and output a result of the voice recognition. Moreover, the intelligent processing unit 220 may execute machine translation based on a voice or text, and output a translation result, for example.

Furthermore, the intelligent processing unit 220 according to the present embodiment may execute an action plan based on a still image, a moving image, a voice, text, sensor information, and the like, and output information related to the action plan. Here, the above-described action plan includes an action plan relating to an action main body in a game and an action body in a real space. For example, the intelligent processing unit 220 can plan the optimal action to be performed next in the game based on the input data, and can output information on this next action. Moreover, for example, the intelligent processing unit 220 may determine an action to be performed by the above-described action body based on the input data, and may output a control signal for achieving the action.

Moreover, for example, the intelligent processing unit 220 according to the present embodiment may execute creation based on a still image, a moving image, a voice, text, or the like, and may output the created creation. For example, the intelligent processing unit 220 is capable of generating and processing images, generating and processing music, writing novels, and so on.

An example of the intelligent processing that can be executed by the intelligent processing unit 220 according to the present embodiment has been described above. Subsequently, processing executable by the output control unit 230 according to the present embodiment for each of the above-described intelligent processing results will be described with a specific example.

Figure 5:
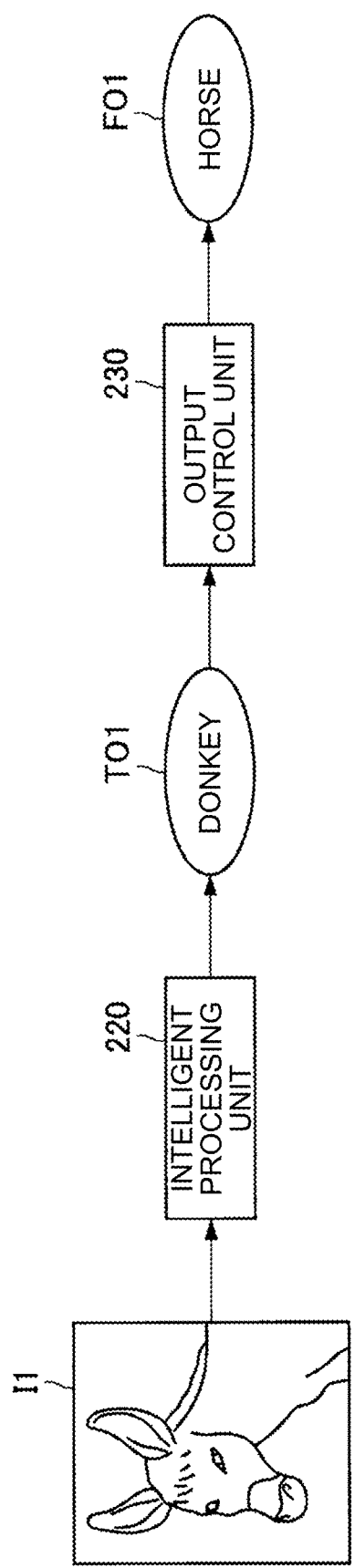
FIG. 5 is a diagram for explaining processing of a class classification result according to the same embodiment.

First, the processing of the output control unit 230 when the intelligent processing unit 220 performs the class classification will be described with the specific example. FIG. 5 is a diagram for explaining processing of a class classification result according to the present embodiment.

In the case of the example illustrated in FIG. 5, an image with a donkey as a subject is input as input data I1 to the intelligent processing unit 220. Further, the intelligent processing unit 220 performs the class classification based on the input data I1 and outputs a class category result "donkey" as an intelligent processing result TO1.

Here, when the attack detection unit 210 determines that the input of the input data I1 is an input that aims at the illegal acquisition of the learned knowledge, the output control unit 230 processes the intelligent processing result TO1 output by the intelligent processing unit 220, and allows output of a processed intelligent processing result FO1 to the information processing terminal 10. In the case of the example illustrated in FIG. 5, the output control unit 230 generates the processed intelligent processing result FO1 in which the class classification result is processed from "donkey" to "horse".

As described above, when it is determined that the input by the third party is not for the legitimate purpose, the output control unit 230 according to the present embodiment may process a label, reliability or the like of at least a part of the class classification result, and allow an output of the processed class classification result to the information processing terminal 10.

For example, the output control unit 230 may calculate closeness between classes in advance and process the class classification result into a label of another class close to the class output by the intelligent processing unit 220, or may process the class classification result into a label of a class having a second or third highest reliability in the class classification processing by the intelligent processing unit 220. According to such processing as described above, it is difficult for the attacker to notice the processing unlike the case where the labels are processed into completely different classes, and accordingly, it is expected that a possibility to continuously collect the input data from the attacker will be increased.

Figure 6:
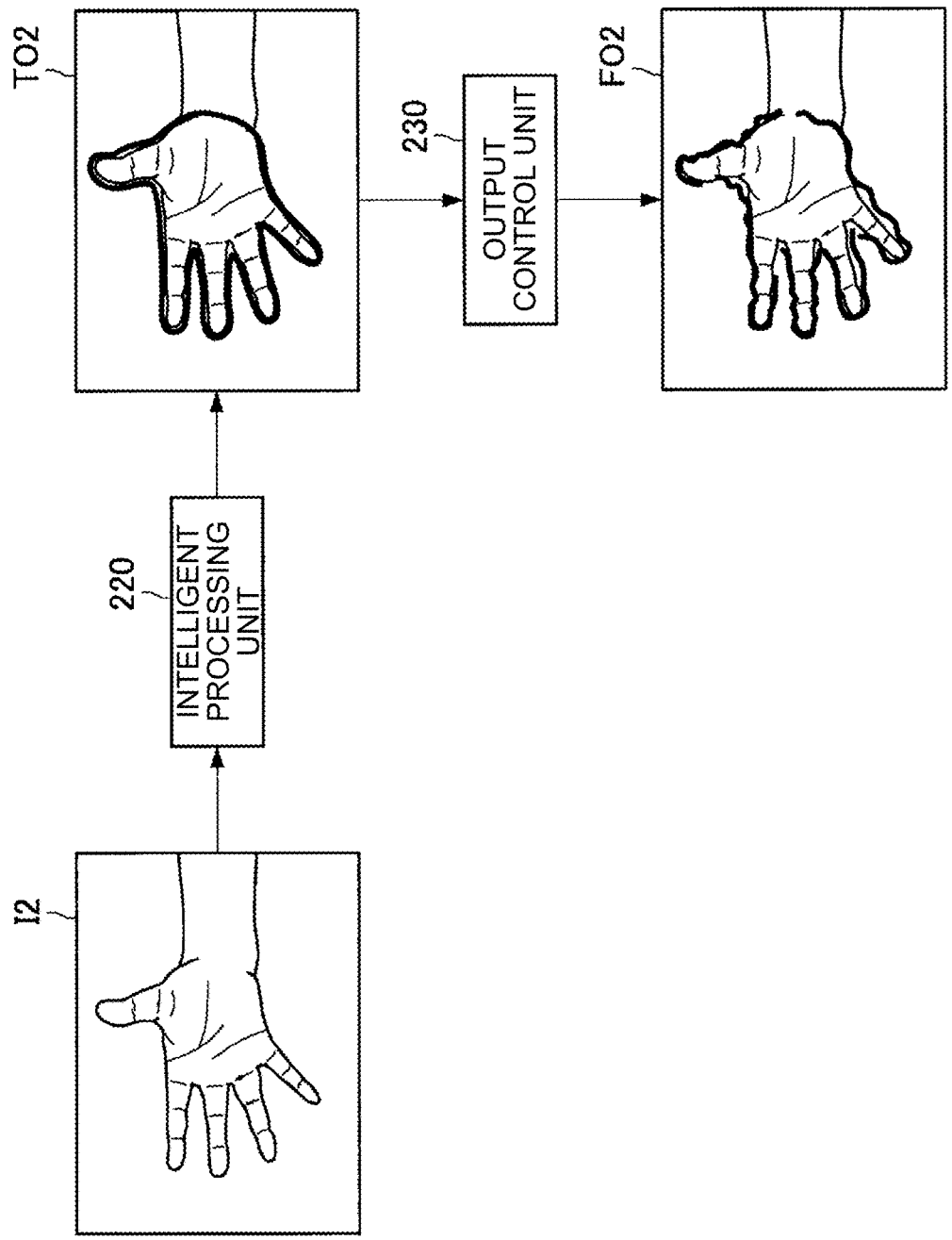
FIG. 6 is a diagram for explaining processing of a segmentation processing result according to the same embodiment.

Next, processing of the output control unit 230 when the intelligent processing unit 220 performs segmentation processing will be described with a specific example. FIG. 6 is a diagram for explaining processing of a segmentation processing result according to the present embodiment.

In the case of the example illustrated in FIG. 6, an image with a human hand as a subject is input as input data I2 to the intelligent processing unit 220. Moreover, the intelligent processing unit 220 executes segmentation processing, which is related to the hand, based on the input data I2, and outputs a detected hand region as an intelligent processing result TO2.

Here, when the attack detection unit 210 determines that the input of the input data I2 is an input that aims at the illegal acquisition of the learned knowledge, the output control unit 230 processes the intelligent processing result TO2 output by the intelligent processing unit 220, and allows output of a processed intelligent processing result FO2 to the information processing terminal 10. In the case of the example illustrated in FIG. 6, the output control unit 230 generates the intelligent processing result FO2 in which accuracy of the detected hand region is deteriorated.

As described above, when it is determined that the input by the third party is not for the legitimate purpose, the output control unit 230 according to the present embodiment may process at least a region, class, reliability or the like of a segmentation processing result, and may allow output of the processed segmentation processing result to the information processing terminal 10.

The processed intelligent processing result FO2 illustrated in FIG. 6 is illustrated in a state in which detection accuracy of the region is greatly deteriorated for the sake of explanation; however, in reality, an extent of the deterioration may be such an extent in which the processed region cannot be discriminated from an unprocessed region by a visual observation of an attacker. For example, it is expected that only the simple noise processing for the region is enough to greatly reduce recognition accuracy of a recognizer in the case of learning the processed segmentation processing result as teacher data.

Figure 7:
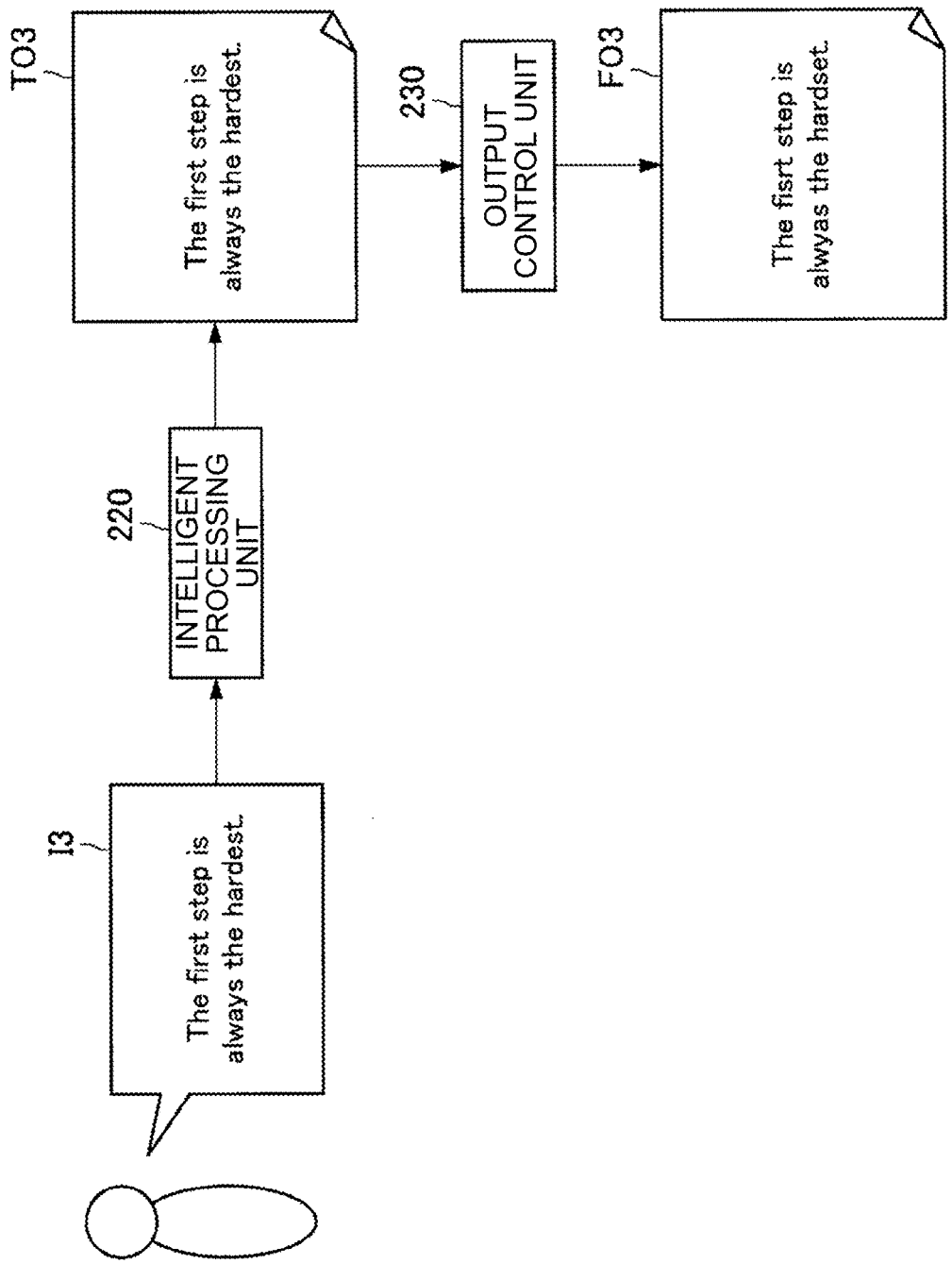
FIG. 7 is a diagram for explaining processing of a natural language processing result according to the same embodiment.

Next, processing of the output control unit 230 when the intelligent processing unit 220 performs natural language processing will be described with a specific example. FIG. 7 is a diagram for explaining processing of a natural language processing result according to the present embodiment.

In the case of the example illustrated in FIG. 7, a human voice is input as input data I3 to the intelligent processing unit 220. Further, the intelligent processing unit 220 executes voice recognition processing based on the input data I3, and outputs a recognized character string as an intelligent processing result TO3.

Here, when the attack detection unit 210 determines that the input of the input data I3 is an input that aims at the illegal acquisition of the learned knowledge, the output control unit 230 processes the intelligent processing result TO3 output by the intelligent processing unit 220, and allows output of a processed intelligent processing result FO3 to the information processing terminal 10. In the case of the example illustrated in FIG. 7, the output control unit 230 generates such an intelligent processing result FO3 in which orders of characters in some words are changed like "frist", "alwyas", and "hardset".

As described above, when it is determined that the input by the third party is not for the legitimate purpose, the output control unit 230 according to the present embodiment may process a character string of at least a part of the natural language processing result, and may allow output of the processed natural language processing result to the information processing terminal 10. Examples of processing the character string include conversion thereof into homonyms and missing as well as the illustrated changes of the orders.

Figure 8:
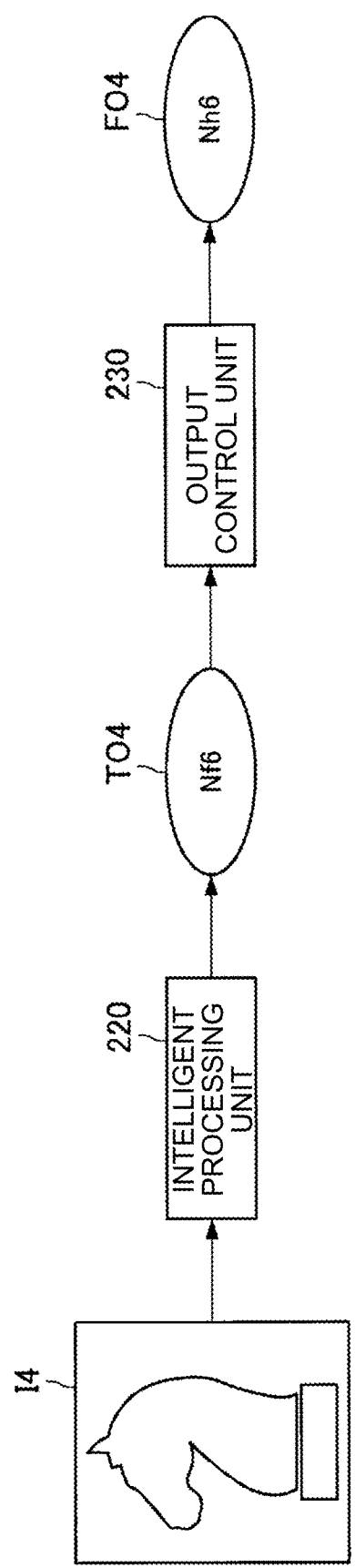
FIG. 8 is a diagram for explaining processing of action plan information according to the same embodiment.

Next, processing of the output control unit 230 when the intelligent processing unit 220 carries out an action plan will be described with a specific example. FIG. 8 is a diagram for explaining processing of action plan information according to the present embodiment.

In the case of the example illustrated in FIG. 8, a war situation in chess is input as input data I4 to the intelligent processing unit 220. Further, the intelligent processing unit 220 executes a search for the next action based on the input data I4, adopts information on the next action to move "knight" to "f6" as the intelligent processing result TO4, and outputs a recognized character string.

Here, when the attack detection unit 210 determines that the input of the input data I4 is an input that aims at the illegal acquisition of the learned knowledge, the output control unit 230 processes the intelligent processing result TO4 output by the intelligent processing unit 220, and allows output of a processed intelligent processing result FO4 to the information processing terminal 10. In the case of the example illustrated in FIG. 8, the output control unit 230 generates the intelligent processing result FO4 in which the information on the next action is processed so as to move "knight" to "h6".

As described above, when it is determined that the input by the third party is not for the legitimate purpose, the output control unit 230 according to the present embodiment may process at least a part of such action plan information, and may allow output of the processed action plan information to the information processing terminal 10. As mentioned above, the action plan according to the present embodiment includes information on the next action in the game and control information on the action body. For example, the output control unit 230 can process the information on the next action so that an action to be performed next in the game does not become the optimal solution, or can process at least a part of the control information so that the action of the action body changes.

Figure 9:
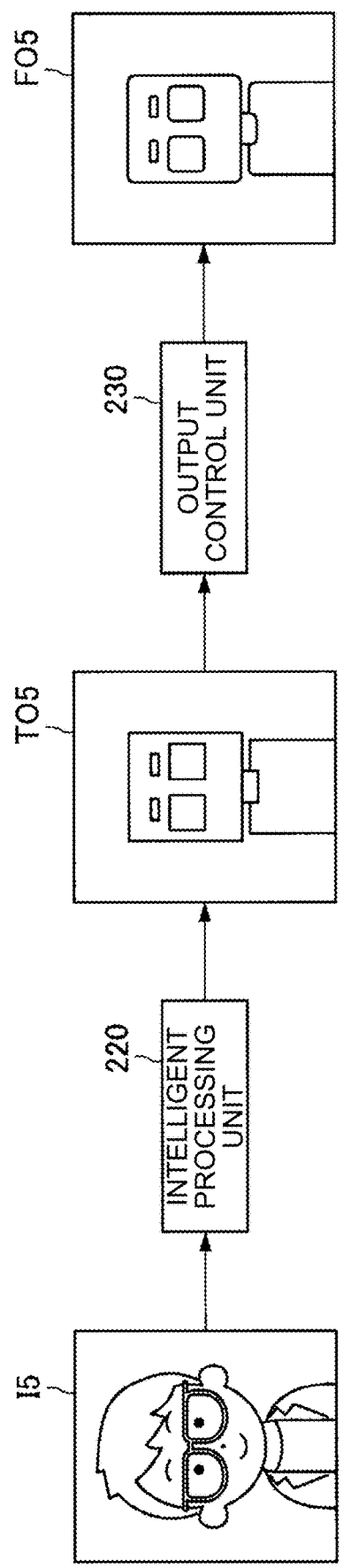
FIG. 9 is a diagram for explaining processing of a creation according to the same embodiment.

Next, processing of the output control unit 230 when the intelligent processing unit 220 makes creation will be described with a specific example. FIG. 9 is a diagram for explaining processing of a creation according to the present embodiment. In FIG. 9, a case where the intelligent processing unit 220 performs a process of converting an input image into a predetermined image style will be described as an example.

In the case of the example illustrated in FIG. 9, a person image to be processed is input as input data I5 to the intelligent processing unit 220. Further, the intelligent processing unit 220 outputs an intelligent processing result TO5 obtained by converting the input data I5, which is input thereto, into a predetermined image style. In FIG. 9, it is assumed that the above-described predetermined image style is an image style in which components in the image are represented by rectangles.

Here, when the attack detection unit 210 determines that the input of the input data I5 is an input that aims at the illegal acquisition of the learned knowledge, the output control unit 230 processes the intelligent processing result TO5 output by the intelligent processing unit 220, and allows output of a processed intelligent processing result FO5 to the information processing terminal 10. In the case of the example illustrated in FIG. 9, the output control unit 230 generates the intelligent processing result FO5 in which a rectangle in the image is processed into a quadrangle with rounded corners. The intelligent processing result FO5 can be regarded to be deteriorated in quality from the original predetermined image style even with such a small change in the processing, and the small change makes it possible to reduce a value of the creation generated by the distillation destination model.

As described above, when it is determined that the input by the third party is not for the legitimate purpose, the output control unit 230 according to the present embodiment may process at least a part of the creation, and may allow output of the processed creation to the information processing terminal 10.

Next, a case will be described in which the intelligent processing unit 220 executes complex intelligent processing including a plurality of recognitions and predictions. The intelligent processing unit 220 according to the present embodiment is also capable of outputting an intelligent processing result including a plurality of recognition results and prediction results for a single input datum.

Figure 10:
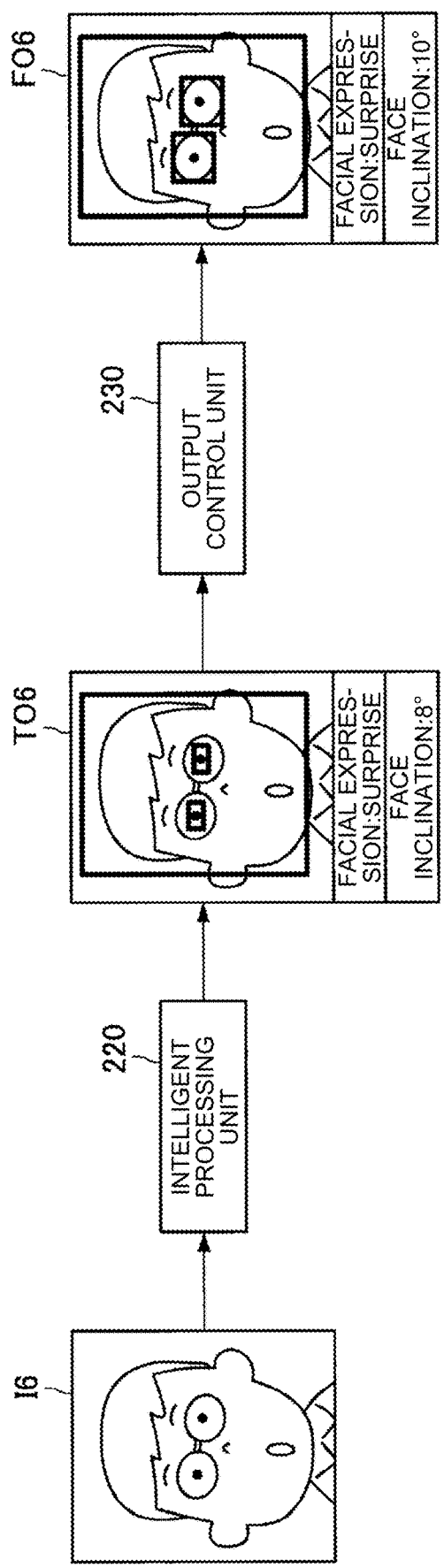
FIG. 10 is a diagram for explaining processing of an intelligent processing result including a plurality of elements according to the same embodiment.

FIG. 10 is a diagram for explaining processing of an intelligent processing result including a plurality of elements according to the present embodiment. In FIG. 10, as an example, a case will be described in which the intelligent processing unit 220 performs recognition of a face region, recognition of an eye region, estimation of a facial expression (emotion), and recognition of a face inclination based on an input human image.

In the case of the example illustrated in FIG. 10, an image including a person's face is input as input data I6 to the intelligent processing unit 220. Moreover, the intelligent processing unit 220 executes complex intelligent processing including the above-described elements based on the input data I6, and outputs a complex intelligent processing result TO6 including recognition results of the face region, the eye region and the face inclination, and a result of the estimation of the facial expression.

Here, when the attack detection unit 210 determines that the input of the input data I6 is an input that aims at the illegal acquisition of the learned knowledge, the output control unit 230 processes at least one of the plurality of elements included in the intelligent processing result TO6 output by the intelligent processing unit 220, and allows output of a processed intelligent processing result FO6 to the information processing terminal 10.

At this time, the output control unit 230 according to the present embodiment may process an element, which is designated by a publisher of the trained model, among the plurality of elements. In a user interface to be described later, the publisher of the trained model is capable of designating an element, from which the illegal acquisition of the learned knowledge is particularly desired to be prevented, among the plurality of elements. In the case of the example illustrated in FIG. 10, the output control unit 230 processes the recognition result of the eye region and the recognition result of the face inclination among the four elements based on the above-described designation. According to the above-described function of the output control unit 230 according to the present embodiment, it becomes possible to effectively protect the learned knowledge of the processing, which is regarded particularly important by the publisher, when the intelligent processing is composed of plural pieces of processing in a complex manner.

<<1.6. Flow of Processing and Setting of Protection Measures>>

Figure 11:
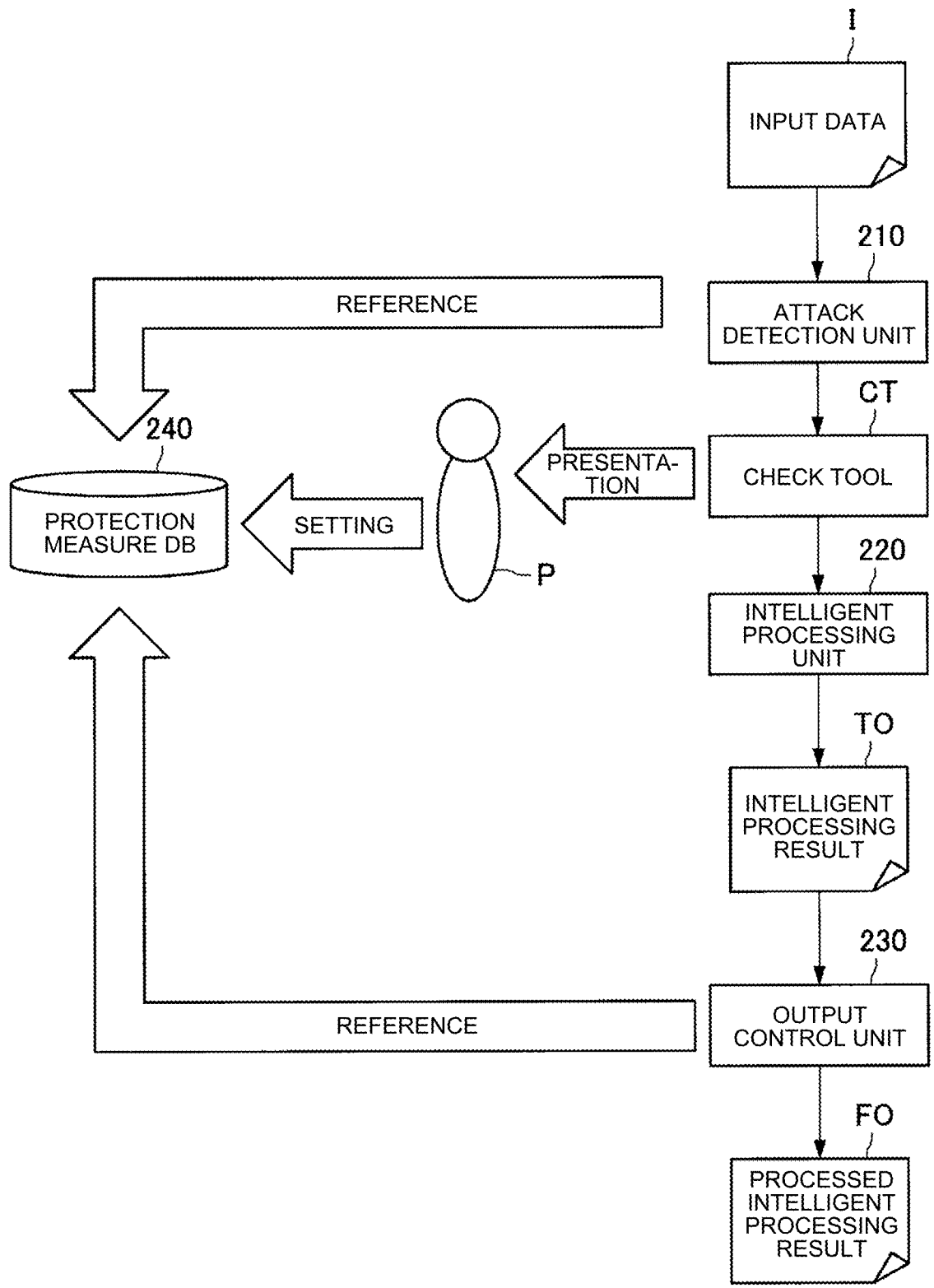
FIG. 11 is a conceptual diagram illustrating a processing flow of the information processing server according to the same embodiment.

Next, referring to FIG. 11 and FIG. 12, a detailed description will be given of a flow of processing of the information processing server 20 according to the present embodiment and a setting of protection measures. FIG. 11 is a conceptual diagram illustrating the flow of processing of the information processing server 20 according to the present embodiment. Moreover, FIG. 12 is a diagram illustrating an example of a setting of the protection measures stored in the protection measure DB 240 according to the present embodiment.

Referring to FIG. 11, first, input data I transmitted from the information processing terminal 10 is input to the attack detection unit 210.

Next, the attack detection unit 210 determines whether or not the input data I thus input aims at the illegal acquisition of the learned knowledge. That is, the attack detection unit 210 attempts to detect an attack by the attacker. At this time, the attack detection unit 210 refers to the protection measure DB 240 and attempts to detect an attack by using a corresponding attack detector.

Referring to FIG. 12, in the protection measure DB 240 according to the present embodiment, for example, corresponding attack detectors and preventive measures are set for each of a type of the input data, a type of the intelligent processing, a domain, and a type of the attack.

For example, when the input data I thus input is an "image" generated by a generator "Random-A" and the intelligent processing executed by the intelligent processing unit 220 is a "class classification" of a domain "animal", the attack detection unit 210 according to the present embodiment, may attempt to detect an attack by using an attack detector "Random-A-detector" corresponding to such conditions.

As described above, the attack detection unit 210 according to the present embodiment selects an attack detector suitable for each of the input data I and of characteristics of the intelligent processing executed by the intelligent processing unit 220, and is thereby capable of detecting the attack by the attacker with high accuracy.

Moreover, the publisher P who publishes the trained model may freely set the protection measures according to the such conditions as mentioned above. For this purpose, the output control unit 230 according to the present embodiment has a function to control an output of the user interface for causing the publisher P to set protection measures against the illegal acquisition of the learned knowledge by the third party.

For example, the publisher P uses a check tool CT, which is provided by the output control unit 230, to confirm the input data I input by the third party, and to grasp means of attack, and it then capable of setting protection measures against the attack in the protection measure DB 240.

In the case of the example illustrated in FIG. 12, for example, the publisher P sets protection measures to "output a label with the third highest reliability" as a protection measure when the input data I thus input is the "image" generated by the generator "Random-A" and the intelligent processing executed by the intelligent processing unit 220 is the "class classification" of the domain "animal".

Moreover, for example, the publisher P sets protection measures, which are related to "noise addition/small", as a preventive measure when the input data I thus input is the "image" generated by the generator "GAN-A" and the intelligent processing executed by the intelligent processing unit 220 is the "segmentation" of the domain "face", and sets "noise addition/large" and "expansion of region" as protection measures when intelligent processing is the "segmentation" of the domain "eyes".

As described above, for example, when the complex intelligent processing for executing the segmentations of the "face" and the "eyes" simultaneously is performed, the publisher P can set different levels of protection measures for each of the above-mentioned elements. According to this, it becomes possible to protect, from the attack, the learned knowledge regarded particularly important by the publisher P.

Referring to FIG. 11 again, the description of the flow of processing of the information processing server 20 according to the present embodiment will be continued. After the attack detection unit 210 executes the attack detection, the intelligent processing unit 220 executes the intelligent processing based on the input data I thus input and outputs the intelligent processing result TO.

Here, when the attack detection unit 210 determines that the input data I aims at the illegal acquisition of the learned knowledge, the output control unit 230 refers to the countermeasure DB 240, processes the intelligent processing result TO based on the protection measures set by the publisher P, and generates the processed intelligent processing result FO. That is, based on the type and generation method of the input data I and the protection measures corresponding to the type and domain of the intelligent processing, the output control unit 230 according to the present embodiment is capable of processing the intelligent processing result TO and allowing output of the processed intelligent processing result FO to the information processing terminal 10.

According to the above-described function of the output control unit 230 according to the present embodiment, while protecting learned knowledge based on the setting by the publisher P, the third party can be caused to continuously input the input data without causing the third party to be aware that the protection measures are taken. According to this, it becomes possible to analyze, from the acquired input data, the features of the random number generator for use, the data generator by GAN or the like, or a data set available on the Internet, and to strengthen the attack detection algorithm by the attack detection unit 210 in advance.

The detailed description has been given of the flow of processing of the information processing server 20 according to the present embodiment and the setting of the protection measures. Note that, in FIG. 12, the case where the attack detection by the attack detection unit 210 is executed prior to the intelligent processing by the intelligent processing unit 220 has been described as an example; however, the attack detection according to the present embodiment may be performed after the intelligent processing by the intelligent processing unit 220 is executed. Further, the attack detection according to the present embodiment may be executed as a part of the intelligent processing by the intelligent processing unit 220.

Moreover, the above description has been given on the assumption that the illegal acquisition of the learned knowledge according to the present embodiment aims mainly at the distillation; however, the illegal acquisition according to the present embodiment is not limited to this example. For example, it is also assumed that the attacker illegally acquires learned knowledge to be used for transfer learning from a publicly laid-open trained model. Usually, in transfer learning, weights related to learned knowledge learned in a certain domain are discarded, and re-learning is performed in another domain. Even in this case, a publicly laid-open trained model is prevented from being illegally used as original learned knowledge that serves as a basis, thus making it possible to appropriately protect publisher's resources.

2. Hardware Configuration Example

Figure 13:
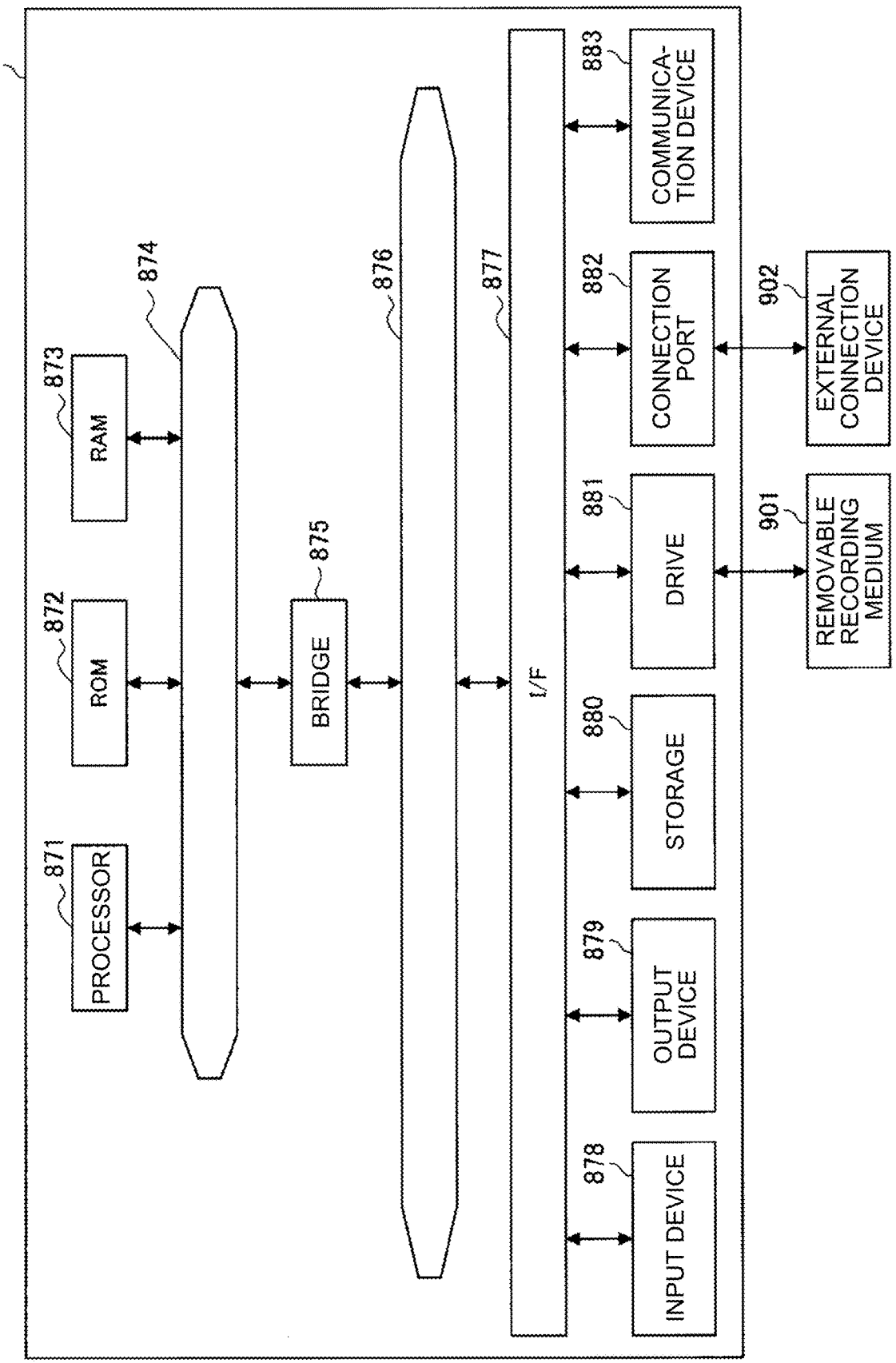
FIG. 13 is a diagram illustrating a hardware configuration example according to an embodiment of the present disclosure.

Next, a hardware configuration example of the information processing server 20 according to an embodiment of the present disclosure will be described. FIG. 13 is a block diagram illustrating a hardware configuration example of the information processing server 20 according to the embodiment of the present disclosure. Referring to FIG. 13, for example, the information processing server 20 includes a processor 871, a ROM 872, a RAM 873, a host bus 874, a bridge 875, an external bus 876, an interface 877, an input device 878, and an output device 879, a storage 880, a drive 881, a connection port 882, and a communication device 883. A hardware configuration shown here is merely an example, and some of the components may be omitted. Moreover, components other than the components shown here may be further included.

(Processor 871)

For example, the processor 871 functions as an arithmetic processing device or a control device, and controls an overall operation of each component or a part thereof based on various programs recorded in the ROM 872, the RAM 873, the storage 880 or a removable recording medium 901.

(ROM 872, RAM 873)

The ROM 872 is means for storing a program read by the processor 871 and data used for an arithmetic operation. For example, the RAM 873 temporarily or permanently stores the program read by the processor 871 and various parameters which appropriately change when the program is executed.

(Host Bus 874, Bridge 875, External Bus 876, Interface 877)

The processor 871, the ROM 872, and the RAM 873 are connected to one another via, for example, the host bus 874 capable of high-speed data transmission. Meanwhile, the host bus 874 is connected to the external bus 876, which has a relatively low data transmission rate, via the bridge 875 for example. Moreover, the external bus 876 is connected to various components via the interface 877.

(Input Device 878)

For the input device 878, for example, a mouse, a keyboard, a touch panel, a button, a switch, a lever, and the like are used. Moreover, as the input device 878, a remote controller capable of transmitting a control signal by using infrared rays or other radio waves may be used. Further, the input device 878 includes a voice input device such as a microphone.

(Output Device 879)

For example, the output device 879 is a device capable of visually or audibly notifying a user of acquired information, the device including, for example, a display device such as a cathode ray tube (CRT), an LCD and an organic EL device, an audio output device such as a speaker, and a head phone, a printer, a mobile phone, a facsimile, or the like. Moreover, the output device 879 according to the present disclosure includes various vibration devices capable of outputting tactile stimuli.

(Storage 880)

The storage 880 is a device for storing various data. As the storage 880, for example, a magnetic storage device such as a hard disk drive (HDD), a semiconductor storage device, an optical storage device, a magneto-optical storage device, or the like is used.

(Drive 881)

For example, the drive 881 is a device for reading information recorded in the removable recording medium 901 such as a magnetic disk, an optical disk, a magneto-optical disk, and a semiconductor memory, or writing information into the removable recording medium 901.

(Removable Recording Medium 901)

The removable recording medium 901 is, for example, a DVD medium, a Blu-ray (registered trademark) medium, an HD/DVD medium, various semiconductor storage media, or the like. Of course, the removable recording medium 901 may be, for example, an IC card equipped with a non-contact type IC chip, an electronic device, or the like.

(Connection Port 882)

The connection port 882 is, for example, a port for connecting an external connection device 902 such as a universal serial bus (USB) port, an IEEE1394 port, a small computer system interface (SCSI), an RS-232C port, and an optical audio terminal.

(External Connection Device 902)

The external connection device 902 is, for example, a printer, a portable music player, a digital camera, a digital video camera, an IC recorder, or the like.

(Communication Device 883)

The communication device 883 is a communication device for connecting to a network, for example, is a communication card for wired or wireless LAN, Bluetooth (registered trademark), or wireless USB (WUSB), a router for optical communication, a router for an asymmetric digital subscriber line (ADSL), a modem for various types of communications, or the like.

3. Summary

As described above, the information processing server 20 according to the embodiment of the present disclosure includes the output control unit 230 that controls the output of the intelligent processing result based on the input data input by the third party and the learned knowledge learned by the neural network. Moreover, the output control unit 230 according to the embodiment of the present disclosure has a feature in that, when it is determined that the input by the third party is not for the legitimate purpose, the intelligent processing result is processed so that the quality thereof decreases, and the processed intelligent processing result is allowed to be output. With such a configuration, it becomes possible to efficiently collect the data for analyzing the attack methods while preventing the illegal acquisition of the learned knowledge.

The preferred embodiments of the present disclosure have been described above in detail with reference to the accompanying drawings; however, the technical scope of the present disclosure is not limited to such examples. It is obvious that those having ordinary knowledge in the technical field of the present disclosure can conceive various modifications or alterations within the scope of the technical idea described in the claims, and it is understood that these also naturally fall within the technical scope of the present disclosure.

Further, the effects described in this description are merely illustrative or exemplary, and are not restrictive. That is, the technology according to the present disclosure can exhibit other effects that are obvious to those skilled in the art from the description in the present description, in addition to or instead of the above effects.

Moreover, the flow of processing of the information processing server 20 in the present description does not necessarily have to be processed in time series in the illustrated order. For example, the respective pieces of processing of the information processing server 20 may be processed in a different order from the illustrated order or may be processed in parallel.

Note that the following configurations also fall within the technical scope of the present disclosure.

(1)
An information processing apparatus comprising:
an output control unit that controls an output of an intelligent processing result based on input data input by a third party and learned knowledge learned by a neural network,
wherein, when it is determined that the input by the third party is not for a legitimate purpose, the output control unit processes the intelligent processing result so that quality of the intelligent processing result decreases, and allows output of the processed intelligent processing result.

(2)
The information processing apparatus according to (1),
wherein, when it is determined that the input by the third party aims at illegal acquisition of the learned knowledge, the output control unit processes the intelligent processing result so that the quality of the intelligent processing result decreases to an extent in which it is difficult for the third party to perceive the decrease of the quality, and outputs the processed intelligent processing result, and
the output control unit allows the output of the processed intelligent processing result.

(3)
The information processing apparatus according to (1) or (2),
wherein, when it is determined that the input by the third party aims at distillation of the learned knowledge, the output control unit processes the intelligent processing result so that quality of intelligent processing by a distillation destination model is lower than quality of intelligent processing by a distillation source model, and allows output of the processed intelligent processing result.

(4)
The information processing apparatus according to any one of (1) to (3),
wherein the intelligent processing result includes a class classification result, and
when it is determined that the input by the third party is not for a legitimate purpose, the output control unit processes a label or reliability of at least a part of the class classification result, and allows output of the processed class classification result.

(5)
The information processing apparatus according to any one of (1) to (4),
wherein the intelligent processing result includes a segmentation result, and
when it is determined that the input by the third party is not for a legitimate purpose, the output control unit processes a region, class or reliability of at least a part of the segmentation result, and allows output of the processed segmentation result.

(6)
The information processing apparatus according to any one of (1) to (5),
wherein the intelligent processing result includes a natural language processing result, and
when it is determined that the input by the third party is not for a legitimate purpose, the output control unit processes a character string of at least a part of the natural language processing result, and allows output of the processed natural language processing result.

(7)
The information processing apparatus according to any one of (1) to (6),
wherein the intelligent processing result includes action plan information, and
when it is determined that the input by the third party is not for a legitimate purpose, the output control unit processes at least a part of the action plan information, and allows output of the processed action plan information.

(8)
The information processing apparatus according to (7),
wherein the action plan information includes next action information on a game, and
when it is determined that the input by the third party is not for a legitimate purpose, the output control unit processes the next action information so that an action to be performed next in the game does not become an optimal solution, and allows output of the processed next action information.

(9)
The information processing apparatus according to (7) or (8),
wherein the action plan information includes control information of an action body, and
when it is determined that the input by the third party is not for a legitimate purpose, the output control unit processes at least a part of the control information so that an action of the action body changes, and allows output of the processed control information.

(10)
The information processing apparatus according to any one of (1) to (9),
wherein the intelligent processing result includes a creation, and
when it is determined that the input by the third party is not for a legitimate purpose, the output control unit processes at least a part of the creation so that quality of the creation decreases, and allows output of the processed creation.

(11)
The information processing apparatus according to any one of (1) to (10),
wherein the intelligent processing result includes a plurality of elements of a recognition result or a prediction result, and
the output control unit processes at least one of the plurality of elements, and allows output of the processed intelligent processing result.

(12)

The information processing apparatus according to (11), wherein the output control unit processes an element among the plurality of elements, the element being designated by a publisher, and outputs the processed intelligent processing result.

(13)

The information processing apparatus according to any one of (1) to (11),
wherein the output control unit controls an output of a user interface for causing a publisher to set protection measures against illegal acquisition of the learned knowledge by the third party.

(14)

The information processing apparatus according to (13), wherein the output control unit processes the intelligent processing result based on the protection measures set in the user interface.

(15)

The information processing apparatus according to (14), wherein the output control unit processes the intelligent processing result based on a type and generation method of the input data and protection measures corresponding to a type and domain of intelligent processing based on the learned knowledge.

(16)

The information processing apparatus according to any one of (1) to (15),
wherein the output control unit controls provision of a check tool for causing a publisher to confirm the input data input by the third party.

(17)

The information processing apparatus according to any one of (1) to (16), further comprising
an attack detection unit that detects an unauthorized use action by the third party.

(18)

The information processing apparatus according to (17), wherein the attack detection unit detects the unauthorized use action by using a type and generation method of the input data and an attack detector corresponding to a type and domain of intelligent processing based on the learned knowledge.

(19)

The information processing apparatus according to any one of (1) to (18), further comprising
an intelligent processing unit that executes intelligent processing based on input data and the learned knowledge.

(20)

An information processing method comprising:
causing a processor to control an output of an intelligent processing result based on input data input by a third party and learned knowledge learned by a neural network,
wherein the control further includes, when it is determined that the input by the third party is not for a legitimate purpose, processing the intelligent processing result so that quality of the intelligent processing result decreases, and allowing output of the processed intelligent processing result.

REFERENCE SIGNS LIST

10 Information processing terminal
110 Input unit
120 Sensor unit
130 Display unit
140 Control unit
150 Server communication unit
20 Information processing server
210 Attack detection unit
220 Intelligent processing unit
230 Output control unit
240 protection measure DB
250 Terminal communication unit
CT Check tool

The invention claimed is:

1. An information processing apparatus comprising:
a protection measure database that stores one or more attack detectors and protection measures that correspond to one or more types of attack and one or more generation methods in generating input data, the protection measures being set to provide output data of learned knowledge of a trained model with quality deterioration; and
circuitry configured to:
control reception of input data for the trained model by a third party from an information processing terminal;
generate a first intelligent processing result via an intelligent processing of the input data by the third party based on the learned knowledge of the trained model; and
when the one or more attack detectors detect an unauthorized use action attacker aiming at illegal acquisition of the output data of the learned knowledge of the trained model by the third party as an attacker based on the input data,
generate a second intelligent processing result by processing the first intelligent processing result based on the one or more protection measures stored in the protection measure database, so that quality of the second intelligent processing result is lower than quality of the first intelligent processing result while keeping the quality of the second intelligent processing result as a predetermined level to continuously receive the input data from the third party, the one or more protection measures corresponding to a type and domain of the intelligent processing of the input data based on the learned knowledge of the trained model; and
output the second intelligent processing result as the output data of the learned knowledge of the trained model, to the information processing terminal.

2. The information processing apparatus according to claim 1,
wherein, when the one or more attack detectors detect that the input data by the third party aims at distillation of the learned knowledge, the circuitry is configured to process the first intelligent processing result so that the quality of the second intelligent processing result by a distillation destination model is lower than the quality of the first intelligent processing result by a distillation source model.

3. The information processing apparatus according to claim 1,
wherein the first intelligent processing result includes a class classification result, and
when the one or more attack detectors detect that the input data by the third party is not for a legitimate purpose, the circuitry is configured to process a label or reliability of at least a part of the class classification result, and output the second intelligent processing result including the processed class classification result.

4. The information processing apparatus according to claim 3,
when the one or more attack detectors detect that the input data by the third party is not for the legitimate purpose, the circuitry is configured to generate the second intelligent processing result including processed label of at least the part of the class classification result by processing the label of at least the part of the class classification result included in the first intelligent processing result so that the processed label of at least the part of the class classification result included in the second intelligent processing result is close to the label of at least the part of the class classification result included in the first intelligent processing result, or generate the second intelligent processing result including processed reliability of at least the part of the class classification result by processing the reliability of at least the part of the class classification result included in the first intelligent processing result so that the processed reliability of at least the part of the class classification result included in the second intelligent processing result is second highest reliability by the intelligent processing.

5. The information processing apparatus according to claim 1,
wherein the first intelligent processing result includes a segmentation result, and
when the one or more attack detectors detect that the input data by the third party is not for a legitimate purpose, the circuitry is configured to process a region, class or reliability of at least a part of the segmentation result, and output the second intelligent processing result including the processed segmentation result.

6. The information processing apparatus according to claim 1,
wherein the first intelligent processing result includes a natural language processing result, and
when the one or more attack detectors detect that the input data by the third party is not for a legitimate purpose, the circuitry is configured to process a character string of at least a part of the natural language processing result, and output the second intelligent processing result including the processed natural language processing result.

7. The information processing apparatus according to claim 1,
wherein the first intelligent processing result includes action plan information, and
when the one or more attack detectors detect that the input data by the third party is not for a legitimate purpose, the circuitry is configured to process at least a part of the action plan information, and output the second intelligent processing result including the processed action plan information.

8. The information processing apparatus according to claim 7,
wherein the action plan information includes next action information on a game, and
when the one or more attack detectors detect that the input data by the third party is not for a legitimate purpose, the circuitry is configured to process the next action information so that an action to be performed next in the game does not become an optimal solution, and output the second intelligent processing result including the processed next action information.

9. The information processing apparatus according to claim 8,
wherein the action plan information includes control information of an action body, and
when the one or more attack detectors detect that the input data by the third party is not for a legitimate purpose, the circuitry is configured to process at least a part of the control information so that an action of the action body changes, and output the second intelligent processing result including the processed control information.

10. The information processing apparatus according to claim 1,
wherein the first intelligent processing result includes created content, and
when the one or more attack detectors detect that the input data by the third party is not for a legitimate purpose, the circuitry is configured to process at least a part of the created content so that quality of the created content decreases, and output the second intelligent processing result including the processed created content.

11. The information processing apparatus according to claim 1,
wherein the first intelligent processing result includes a plurality of elements of a recognition result or a prediction result, and
the circuitry is configured to process at least one of the plurality of elements, and output the second intelligent processing result including the at least one of the plurality of processed elements.

12. The information processing apparatus according to claim 11,
wherein the circuitry is configured to process an element among the plurality of elements, the element being designated by a publisher, and outputs the second processed intelligent processing result including the processed element.

13. The information processing apparatus according to claim 1,
wherein the circuitry is configured to control an output of a user interface to cause a publisher to set at least one of the one or more protection measures against illegal acquisition of the output data of the learned knowledge by the third party.

14. The information processing apparatus according to claim 13,
wherein the circuitry is configured to process the first intelligent processing result based on the at least one of the one or more protection measures set in the user interface.

15. The information processing apparatus according to claim 14,
wherein corresponding attack detector and at least one of the one or more protection measures is are set for each of a type of the input data, a type and a domain of the intelligent processing, and a type of the attack, and the circuitry is configured to process the first intelligent processing result based on a type and generation method of the input data and the at least one of the one or more protection measures corresponding to the type and the domain of the intelligent processing based on the learned knowledge.

16. The information processing apparatus according to claim 1, wherein the circuitry is configured to control provision of a check tool for causing a publisher to confirm the input data input by the third party.

17. The information processing apparatus according to claim 1, wherein the one or more protection measures stored in the protection measure database correspond to one or more types and domains of the intelligent processing of the input data based on the learned knowledge of the trained model.

18. The information processing apparatus according to claim 1, wherein the circuitry is configured to output the first intelligent processing result to the information processing terminal, when the one or more attack detectors do not detect an unauthorized use action by an attacker based on the received input data.

19. The information processing apparatus according to claim 1,
wherein the circuitry is configured to analyze a predetermined amount of the input data from the third party without causing the information processing terminal to detect the one or more protection measures, and
wherein the circuitry is configured to update the protection measure database including the one or more attack detectors and the one or more protection measures based on analyzed result of the input data from the third party.

20. An information processing method comprising:
storing, in a protection measure database, one or more attack detectors and one or more protection measures that correspond to one or more types of attack and one or more generation methods in generating input data, the one or more protection measures being set to provide output data of learned knowledge of a trained model with quality deterioration;
receiving input data for the trained model by a third party from an information processing terminal;
generating a first intelligent processing result via an intelligent processing of the input data by the third party based on the learned knowledge of the trained model; and
when the one or more attack detectors detect an unauthorized use action aiming at illegal acquisition of the output data of the learned knowledge of the trained model by the third party as an attacker based on the input data,
generating a second intelligent processing result by processing the first intelligent processing result based on the one or more protection measures stored in the protection measure database, so that quality of the second intelligent processing result is lower than quality of the first intelligent processing result while keeping the quality of the second intelligent processing result as a predetermined level to continuously receive the input data from the third party, the one or more protection measures corresponding to a type and domain of the intelligent processing of the input data based on the learned knowledge of the trained model; and
outputting the second intelligent processing result as the output data of the learned knowledge of the trained model, to the information processing terminal.

* * * * *